US009295932B2

(12) United States Patent
Pickren et al.

(10) Patent No.: US 9,295,932 B2
(45) Date of Patent: Mar. 29, 2016

(54) SULFUR PARTICULATES REMOVER

(71) Applicants: Roy Anthony Pickren, Baton Rouge, LA (US); Roger Jacques Maduell, Mandeville, LA (US)

(72) Inventors: Roy Anthony Pickren, Baton Rouge, LA (US); Roger Jacques Maduell, Mandeville, LA (US)

(73) Assignee: Cll Consulting, LLC, New Orleans, LA (US)

( * ) Notice: Subject to any disclaimer, the term of this patent is extended or adjusted under 35 U.S.C. 154(b) by 0 days.

(21) Appl. No.: 13/987,128

(22) Filed: Jul. 2, 2013

(65) Prior Publication Data
US 2014/0000227 A1    Jan. 2, 2014

Related U.S. Application Data

(60) Provisional application No. 61/690,648, filed on Jul. 2, 2012.

(51) Int. Cl.
*B01D 46/00* (2006.01)
*B01D 45/08* (2006.01)

(52) U.S. Cl.
CPC ...................................... *B01D 45/08* (2013.01)

(58) Field of Classification Search
CPC ........ B01D 50/00; B01D 53/14; B01D 53/54; B01D 53/92; B01D 53/1487
USPC ............ 55/300, 317, 385.3, 405, 409, 459.1, 55/482, 485, DIG. 30; 96/256, 263, 226, 96/232, 329, 351, 361, 364–366; 95/237, 95/273, 287

See application file for complete search history.

(56) References Cited

U.S. PATENT DOCUMENTS 6,398,851 B1 *   6/2002   Bose .............................. 95/273
2004/0081595 A1 *   4/2004   Turek et al. ................... 422/179

* cited by examiner

*Primary Examiner* — Jason M Greene
*Assistant Examiner* — Karla Hawkins
(74) *Attorney, Agent, or Firm* — Raúl V. Fonte

(57) ABSTRACT

A sulfur particulates remover is provided for removing sulfur particulates from gaseous streams generated in sulfur storage tanks and other types of sulfur containers and carriers. More than 90% of the sulfur particulates are easily removed in most cases. The sulfur particulates remover comprises a conical or prismatic shell structure equipped with vibrators, a cover plate and a stack or similar venting means. A deflector may be mounted inside the shell structure. This system is typically installed on the roof of a liquid sulfur storage tank, pit or other sulfur container using conventional hardware. The lower portion of the particulates remover is preferably a substantially round pipe to which a conical upper portion is attached by welding means or by means of bolts or a support flange. No steam, cooling water or any other external-source heating or cooling is necessary in the operation of the system.

8 Claims, 6 Drawing Sheets

TOP VIEW

ELEVATION

EMBODIMENT A       EMBODIMENT B

Sulfur particulates remover recommended surface area as a function of ambient temperature for a sulfur tank having a vapor space temperature of 240°F Sulfur particulates remover recommended surface area as a function of ambient temperature for a sulfur tank having a vapor space temperature of 260°F

SULFUR PARTICULATES REMOVER

This application is a non-provisional application for patent entitled to a filing date and claiming the benefit of earlier-filed Provisional Application for Patent No. 61/690,648, filed on Jul. 2, 2012 under 37 CFR 1.53 (c).

FIELD OF THE INVENTION

This invention relates to the removal of sulfur particulates from the vapors emanating from liquid sulfur containers. In general, this invention relates to a sulfur particulates remover, which is a system for preventing or minimizing emissions of particulate sulfur to the atmosphere. The invention is specifically concerned with preventing emissions of particulate sulfur from escaping to the atmosphere and allowing the recovery and reincorporation of otherwise lost sulfur into a sulfur tank or container. The system of the invention is particularly applicable to the handling and storage of liquid sulfur in storage tanks, trenches, pits and other forms of storage containers and containment facilities, but it also has applications in the handling and transportation of liquid sulfur in ships, barges, International Shipping Organization (ISO) containers, railroad cars, tractor trailers and other types of carriers. The system effectively removes sulfur vapor and sulfur particulates from the gaseous streams generated in these sulfur tanks and containers and allows the recovery and reincorporation of the sulfur values into the tanks and containers.

BACKGROUND OF THE INVENTION

Much elemental sulfur, used in the commercial production of sulfuric acid and numerous other chemicals, is transported, handled and stored as a hot liquid, usually at temperatures between about 250° F. and about 300° F. Insulated railroad cars and storage tanks are heated to these temperatures with steam or other means in order to maintain the sulfur in its molten state. An industrial heated liquid sulfur storage tank, usually made of mild steel, typically may hold anywhere from 1,000 tons to 15,000 tons of commercial liquid sulfur in elemental form. Such tanks must be covered in order to prevent or minimize heat losses, reduce vapor emissions and prevent or minimize rain water from entering and mixing with the liquid sulfur. As a result, a vapor space, containing inorganic sulfur gases and other noxious gases, forms above the surface of the liquid sulfur in the tank. The vapor space also contains contaminated air and other gases that come off the stored sulfur as a result of the common practice of sparging air into the sulfur from the bottom of the tank in order to prevent or minimize the buildup of dissolved inorganic sulfur gases (such as $H_2S$) in the molten sulfur. These injected gases must be vented in order to prevent excessive pressure buildup in the tank, and consequently the tanks are always equipped with one or more vents, which also help with the occasional thermal contractions and expansions caused by the fluctuations of the temperature inside the tank.

Although the vapor pressure of the molten sulfur at temperatures between about 250° F. and 300° F. is relatively low and this results in relatively low concentrations of sulfur vapor in the vapor space above the surface of the molten sulfur in the tank, the air in the vapor space will still contain small but relatively significant quantities of elemental sulfur in the form of a "sulfur mist", which may contain elemental sulfur in vapor form, in liquid droplet form and/or in solid particulate form. When this sulfur mist passes upwards though the tank vents in the process of exiting the tank together with the previously mentioned contaminated air and gases accumulated in the vapor space above the liquid sulfur its temperature tends to drop, with the result that some of its sulfur content (in vapor form, liquid form and/or solid form) condenses and solidifies into microscopic sulfur particles that tend to remain suspended in the stream. These microscopic sulfur particles are often referred to as "particulate sulfur emissions" or "emissions of particulate sulfur" or, simply, "sulfur particulates".

Excessive emissions of sulfur particulates cause environmental concerns and operating inefficiencies because they affect the quality of the air surrounding the sulfur storage operations and translate into sulfur product losses, which literally go up in the air. Also, sulfur vapors will sublime and form sulfur crystals, commonly known as "sulfur flowers". Sulfur flowers tend to collect in unheated vents and ducts, and they can cause reduced flow rates and/or complete plugging of those system components.

U.S. Pat. No. 5,340,383, of Womack, addresses the problems associated with excessive emissions of particulate sulfur from liquid sulfur storage tanks and provides a technique for dealing with and reducing them. The technique employed by Womack calls for the use of a special baffled scrubber-condenser and requires, among other things, that the sulfur vapor gas stream being processed be cooled by means of indirect contact with cooling water passed through jacketed walls and baffles of the scrubber-condenser. The use of a special baffled scrubber-condenser with cooling water passing through its jacketed walls and baffles significantly increases the capital and operating costs of the sulfur storage facility. In addition, this technique is not always efficient because the special baffled scrubber-condenser has to be periodically heated in order to melt the sulfur that accumulates inside its walls and return it (the sulfur) to the storage tank, adding an additional maintenance step to the operation.

The present invention also addresses the problems associated with excessive emissions of particulate sulfur from liquid sulfur storage tanks and also provides a technique for dealing with and reducing them; but it does so without introducing a costly special baffled scrubber-condenser with cooling water passing through its jacketed walls and baffles. In addition, the present invention also improves the ability to scrub the gases escaping from the vapor space by reducing or eliminating the sulfur particulates that would otherwise build up in a scrubber, causing inefficient or ineffective operation and operating and maintenance problems such as complete or partial plugging of pipes, packing and liquid containing compartments.

It is an object of the present invention to provide a system for preventing or reducing emissions of particulate sulfur to the atmosphere without the need to introduce a costly scrubber-condenser requiring cooling water to pass through its jacketed walls and baffles. It is also an object of this invention to provide a system for the effective handling of gases escaping from a sulfur storage vapor space by reducing or eliminating the sulfur particulates that would otherwise build up in the sulfur storage facility causing inefficient operating and maintenance problems such as complete or partial plugging of pipes, packing and liquid containing compartments. A further object of the invention is to provide a practical and efficient system for preventing or minimizing the buildup of sulfur particulate matter in sulfur tanks and containers with minimum hardware and inexpensive equipment. These and other objects of the invention will become apparent from the descriptions that follow.

SUMMARY OF THE INVENTION

In accordance with the present invention, a liquid sulfur storage container such as a storage tank is typically equipped with at least one conical or prismatic shell structure to which specified vibrators are attached on its outer surface while controlling the flow rate of the gas stream moving through the shell structure. The shape of the shell structure should be substantially conical, that is, having the general shape of a cone, or substantially prismatic, that is, having the general shape of an inverted pyramid with, say, about three or four sloped sides. The lower portion of a conical shell structure may be attached to a substantially round pipe base manufactured of the same strong (but flexible and elastic) material. The lower portion of a prismatic shell structure may be attached to a square or otherwise rectangular base manufactured of the same strong (but flexible and elastic) material. Preferably, the conical or prismatic shell structure as well as the base should be made of stainless steel or some other flexible and elastic metal. A cover, e.g., a cover plate, is attached to the top of the conical shell structure; and venting means are attached to the cover plate for venting the processed gases to the atmosphere. The cover plate is preferably made of the same metal or material as that used for the shell structure. The venting means may be a simple opening on the cover plate or they may be a stack, welded or bolted to the cover plate, to provide height and direction to the flow of gases. The sulfur particulates remover may be installed on the roof of the tank using conventional hardware.

In one embodiment of the invention the diameter of a conical upper portion of the shell structure increases from approximately one foot at its lowest point to about two or three feet at its highest point. In a preferred embodiment a conical shell structure of the sulfur particulates remover has a "slopping angle", or "cone opening angle" of approximately 14°. The slopping angle is the angle created between a perpendicular line running from the bottom of the conical shell structure to its top and a straight line from the bottom of the conical shell structure along its outer surface to its top. See FIG. 3, below. Smaller slopping angles (e.g., 10°) and larger slopping angles (e.g., 20°-60°), as well as various other heights and diameters, may be used effectively, depending on the gas stream flow rate and other conditions such as the amount of surface area desired. The height and the diameter of the conical shell structure may vary depending on the cone opening angle: the smaller the angle, the taller the vent should be in order to provide the desired overall surface area as discussed below. Mounted on the outside surface of this conical upper portion of the system are two or more pneumatic vibrators so designed and so located as to provide the desired level of vibration to the system. The top end of the conical upper portion is provided with a cover plate, and the cover plate is provided with venting means such as an opening through the plate or a stack, attached to the plate, that restricts and redirects the gas stream to desired locations. The stack may be a pipe section made of strong metal and attached to the cover plate by welding means or by means of bolts or a support flange, or by any similar means. The conical shell structure is preferably equipped with an internally-secured deflector plate to assist in redirecting the flow of the gas stream in order to optimize operating conditions and maximize the amount of sulfur that is thereby recovered and reincorporated into the storage tank. The deflector plate is secured to the system by bolting, welding or otherwise attaching it to the cover or to some other convenient location, e.g., on the upper or middle portion of the shell structure. It is significant that no external-source heating or cooling is necessary in the operation of the system of the invention.

Enough surface area should be provided inside the sulfur particulates remover to allow the sulfur vapor to cool sufficiently and cause the precipitation of the emissions of particulate sulfur; and enough vibration should be provided to the surface of the remover to cause the precipitation of the emissions of particulate sulfur while preventing the precipitated sulfur particles from attaching themselves to the conical shell structure and plugging the unit.

In most cases, the two pneumatic vibrators should be mounted and located at approximately symmetrical locations with respect to each other on the outer surface of the conical shell structure. On small units one vibrator may be adequate, whereas on very large units more than two vibrators may be recommended. The tank may additionally be equipped with one or more regular vents of the type conventionally used on most liquid sulfur storage tanks. Usually, one single sulfur particulates remover will suffice for handling the flow of gases exiting most sulfur storage tanks or other containers, but multiple units may be used on very large tanks or containers and/or whenever only small remover units are available.

DETAILED DESCRIPTION OF THE INVENTION

The invention will be described in detail in terms of its application to the handling and storage of liquid sulfur in liquid sulfur storage tanks, but it will be understood that the invention also applies to the handling and storage of liquid sulfur in trenches, pits and other forms of storage containers and containment facilities, as well as to the handling and transportation of liquid sulfur in ships, barges, ISO containers, railroad cars, tractor trailers and other types of carriers that may be used to transport liquid sulfur from any one source or facility to another source or facility. This is because the operative principles that apply to the concept of the invention apply equally to its use in sulfur handling and storage situations and in sulfur handling and transportation situations.

A typical liquid sulfur storage tank may hold anywhere between about 1,000 and 10,000 tons of sulfur and, depending on the various conditions mentioned above, may generate a gaseous stream exiting the tank at between about 30 and 300 cubic feet per minute (cfm) at a temperature of typically between about 225° F. and 260° F. Certain sulfur pits may hold between about 100 and 1,000 tons of sulfur that generate gaseous streams exiting at between about 30 and 1,000 cubic feet per minute.

Figure 1:
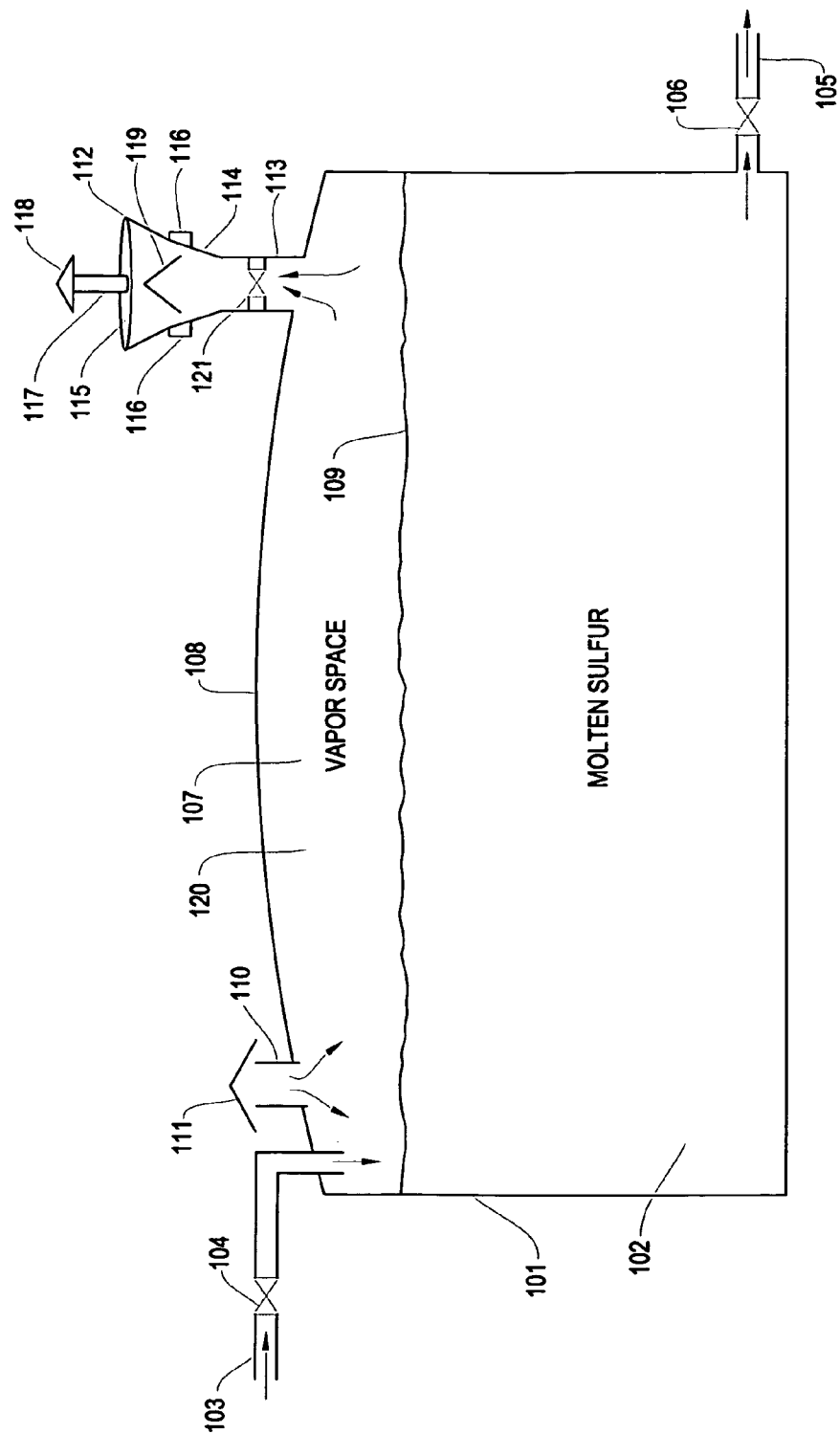
FIG. 1 is a schematic diagram depicting one configuration of a conventional liquid sulfur storage tank that has been equipped with a preferred embodiment of a conical-shell-structure sulfur particulates remover of the invention.

By way of illustration, referring to FIG. 1, liquid sulfur storage tank 101 holds approximately 4,000 tons of molten sulfur 102 at a temperature of about 260° F. The molten sulfur is fed into storage tank 101 through inlet molten sulfur line 103, and its flow is controlled by inlet molten sulfur valve 104 located within inlet molten sulfur line 103. Sulfur is withdrawn from storage tank 101 through outlet molten sulfur line 105 on an as-needed basis, and its flow is controlled by outlet molten sulfur valve 106 located within outlet molten sulfur line 105. Vapor 107 is contained within the tank, in vapor space 120 above molten sulfur 102, between tank roof 108 and molten sulfur surface 109 of molten sulfur 102. The tank is also equipped with conventional vent 110 which allows ambient air to flow into vapor space 120 and which helps with the occasional thermal contractions and expansions caused by the fluctuations of the temperature inside the tank. The ambient temperature outside the sulfur storage tank typically may fluctuate anywhere between about 30° F. and 120° F. Conventional vent 110 is provided with vent cap 111 to protect it from rain and other elements. The temperature of vapor 107 in vapor space 120 is about 240° F. Depending on atmospheric and process conditions, the temperature of the vapor in the vapor space above the molten sulfur may fluctuate anywhere between about 200° F. and 275° F. and, typically, between about 225° F. and 260° F. Vapor space 120 contains inorganic sulfur gases and other noxious gases. Typically, these include dissolved inorganic sulfur gases such as $H_2S$, $SO_2$ and other such gases that tend to be released from solution in the liquid sulfur 102. In addition, the air in the vapor space also contains small quantities of elemental sulfur in the form of a sulfur mist made up of elemental sulfur in vapor form, in liquid droplet form and/or in solid particulate form. As the gases move upwards in the tank and cool, the sulfur content of the sulfur mist condenses and solidifies into microscopic sulfur particles that tend to remain suspended in the stream. Vapor space 120 also contains sulfur vapors that sublime and form sulfur crystals, commonly known as "sulfur flowers". If not removed or prevented from forming, sulfur flowers collect in vents and ducts, and cause reduced flow rates and plugging of the pipes and other components of the storage operation. Sulfur particulates remover 112 is installed on tank roof 108 by welding it or otherwise attaching it to any existing opening on tank roof 108, for example, an existing opening for providing a conventional vent such as vent 110. If no existing opening is available, one may be provided by simply cutting an opening on tank roof 108 and attaching sulfur particulates remover 112 above the opening. Sulfur particulates remover 112 comprises a substantially round (cylindrical) metal base and vapor conduit 113, a substantially conical shell structure 114, and a cover plate 115, and is further provided with two pneumatic vibrators 116 that are installed on the outer surface of conical shell structure 114 at approximately symmetrical positions with respect to each other on said outer surface. Pneumatic vibrators are preferred, but hydraulic or electric vibrators may also be used. Stack 117 is welded or otherwise attached to cover plate 115 and provided with vent cap 118 to protect it from rain and other elements. An adjustable butterfly valve or similar damper (not shown) is optionally installed inside stack 117 in order to be able to control and adjust the amount of gases flowing out of the system. Sulfur particulates remover 112 is also equipped with deflector plate 119 within its inner surface which provides a circuitous route for gases that exit the storage tank through stack 117. Optional valve 121 may be used to restrict, control and/or cutoff the gases flowing into sulfur particulates remover 112 whenever such operations are necessary or desirable.

Figure 2:
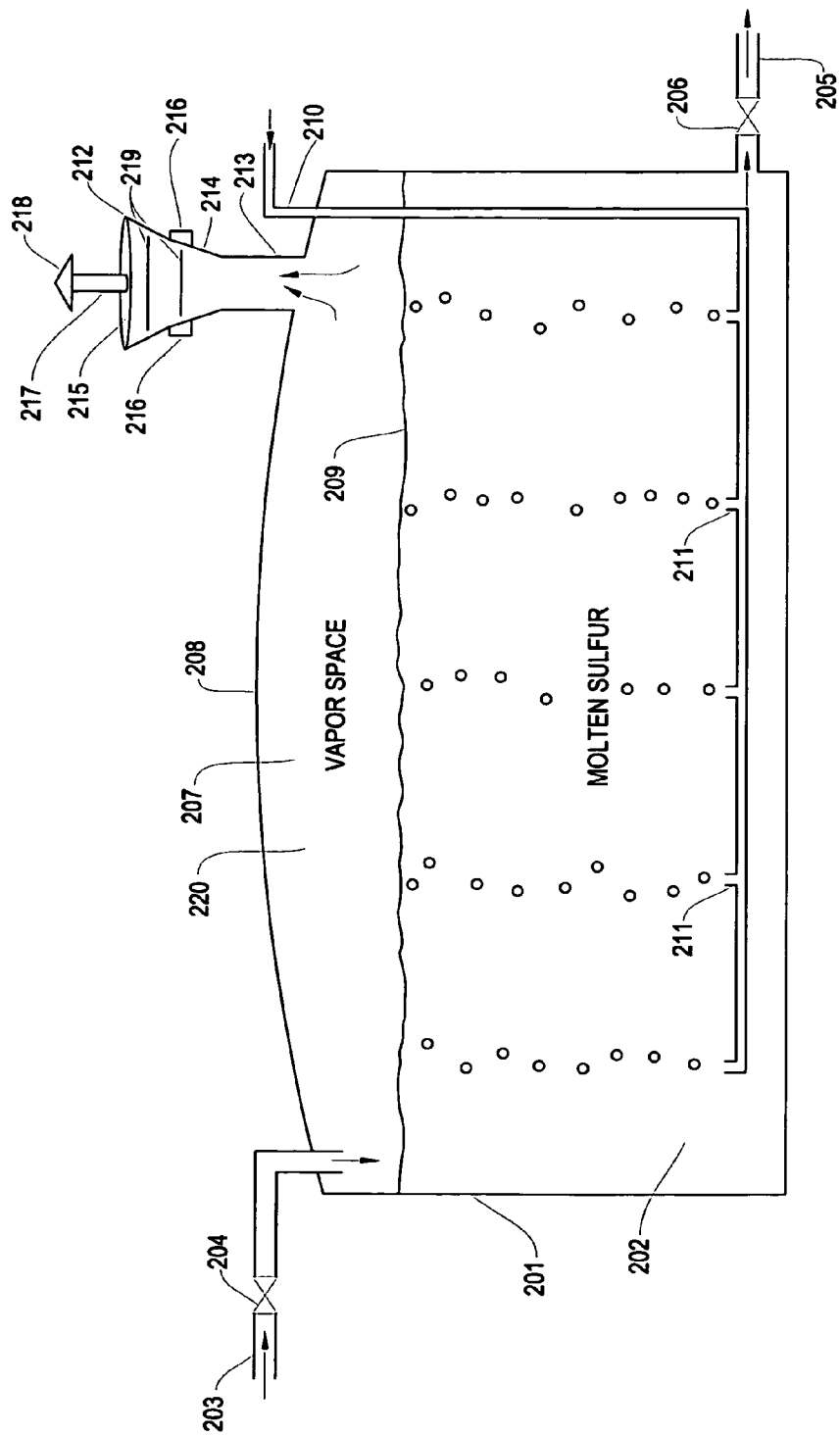
FIG. 2 is a schematic diagram depicting another configuration of a conventional liquid sulfur storage tank that has also been equipped with a preferred embodiment of a conical-shell-structure sulfur particulates remover of the invention.

FIG. 2 depicts another configuration of a conventional liquid sulfur storage tank that has also been equipped with a preferred embodiment of the conical sulfur particulates remover system of the invention. In this configuration the sulfur particulates remover has been installed instead of a conventional vent (or as a replacement of a previously existing conventional vent), making it unnecessary to use any conventional vents in the fabrication and operation of the storage tank. This configuration also illustrates the use of the sulfur particulates remover of the invention in sulfur tanks where air is sparged into the sulfur from or near the bottom of the tank in order to prevent or reduce the buildup of dissolved inorganic sulfur gases such as $H_2S$ in the molten sulfur. Thus, in FIG. 2 liquid sulfur storage tank 201 holds approximately 4,000 tons of molten sulfur 202 at a temperature of about 260° F. The molten sulfur is fed into the tank through inlet molten sulfur line 203, and its flow is controlled by inlet molten sulfur valve 204 located within inlet molten sulfur line 203. Sulfur is withdrawn from storage tank 201 through outlet molten sulfur line 205 on an as-needed basis, and its flow is controlled by outlet molten sulfur valve 206 located within outlet molten sulfur line 205. Vapor 207 is contained within the tank in vapor space 220, above molten sulfur 202, between tank roof 208 and molten sulfur surface 209. Air is fed into the storage tank through air inlet pipe 210 and sparged into the sulfur though air nozzles 211. The temperature of vapor 207 in vapor space 220 is about 240° F. Depending on atmospheric and process conditions, the temperature of the vapor in the vapor space above the molten sulfur may fluctuate anywhere between about 200° F. and 275° F. and, typically, between about 225° F. and 260° F. Vapor space 207 contains inorganic sulfur gases and other noxious gases. Typically, these include dissolved inorganic sulfur gases such as $H_2S$, $SO_2$ and other such gases that tend to be released from solution in liquid sulfur 202. As in the case of the configuration depicted in FIG. 1, these gases also typically contain small quantities of elemental sulfur in the form of a sulfur mist as well as sulfur flowers which tend to collect and plug the pipes and other conduits and equipment components of the storage and handling operations. Conical sulfur particulates remover 212 is installed on tank roof 208 by welding it or otherwise attaching it to a previously existing opening on the tank roof, for example, an existing opening previously made for providing the tank with a conventional vent. If no existing opening is available, one may be provided by simply cutting an opening on tank roof 208 and attaching sulfur particulates remover 212 above the opening. Sulfur particulates remover 212 comprises a substantially round (cylindrical) metal base and vapor conduit 213, a substantially conical shell structure 214, and a cover plate 215, and is further provided with two pneumatic vibrators 216 that are installed on the outer surface of conical shell structure 214 at approximately symmetrical positions with respect to each other on said outer surface. Stack 217 is welded or otherwise attached to cover plate 215 and provided with vent cap 218 to protect it from rain and other elements. An adjustable butterfly valve or similar damper (not shown) is optionally installed inside stack 217 in order to be able to control and adjust the amount of gases flowing out of the system. Sulfur particulates remover 212 is also equipped with deflector plates 219 within its inner surface, which provide a circuitous route for gases that exit the storage tank through stack 217. Deflector plate plates 219 may take the form of different configurations inside sulfur particulates remover

212, two of which are as shown on FIG. 1 and FIG. 2. The sulfur particulates remover of the invention may be used in sulfur tanks where air is sparged into the sulfur to prevent or reduce the buildup of dissolved inorganic sulfur gases and in sulfur tanks where no air sparging is used. Depending on the specific operating requirements, a tank may be configured, as in FIG. 2, without a conventional roof vent, or without an air sparging system. In these cases ambient air will not normally flow into the tank but, upon tank cooling, may have occasion to backflow into the tank through stack 217 through sulfur particulates remover 212 and then through metal base and vapor conduit 213.

Figure 3:
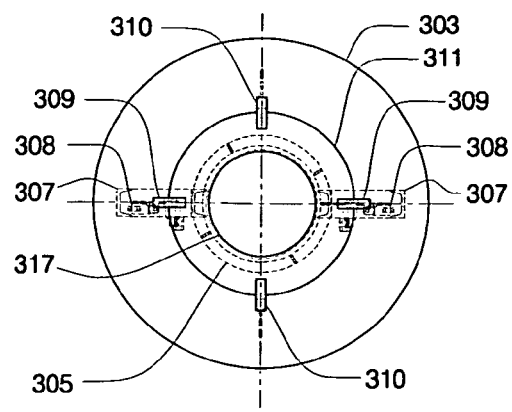
FIG. 3 is a schematic diagram showing a top view and an elevation view of the key features of a preferred embodiment of a conical-shell-structure sulfur particulates remover.
Figure 3:
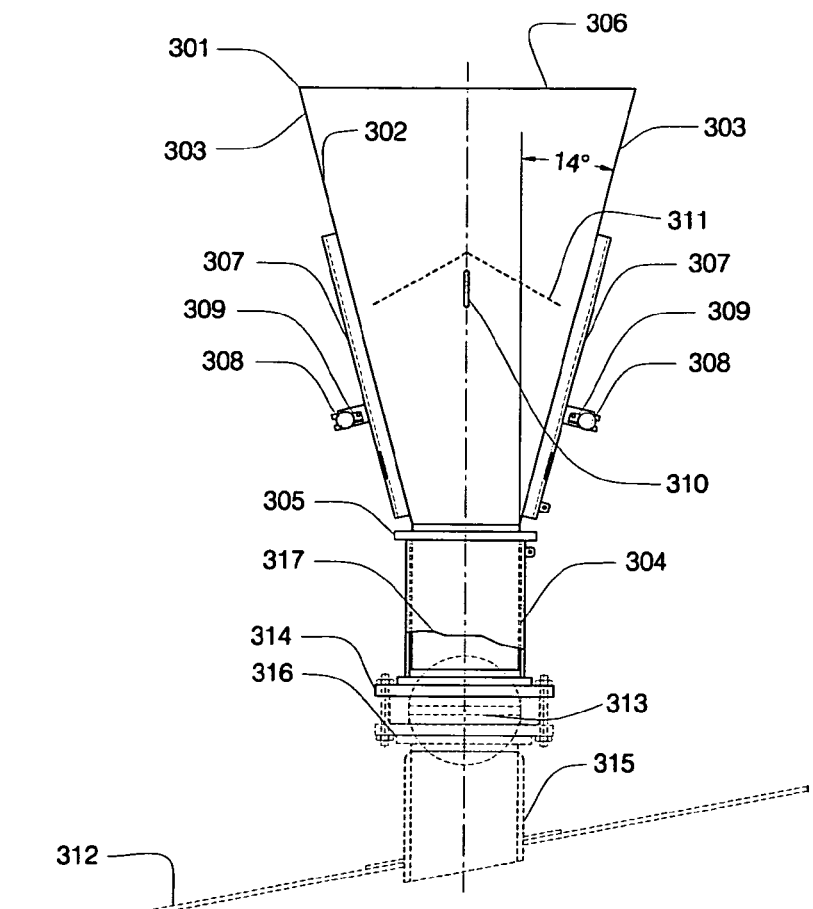

FIG. 3 depicts some of the features of a preferred embodiment of the sulfur particulates remover showing a top view and an elevation view of those features. Referring to FIG. 3, conical shell structure 301 is made of ⅛-inch thick stainless steel and has an inner surface 302 and an outer surface 303. Round (cylindrical) base 304, also made of ⅛-inch thick stainless steel, is 12 inches in diameter and 18 inches high, and is attached to conical shell structure 301 by means of welding. Flange 305 is attached to round base 304 by means of welding, and the weight of conical shell structure 301 and all components above flange 305 are supported by flange 305 sitting on top of, but not attached to, adapter 317. In the specific embodiment shown in FIG. 3, round base 304 and flange 305 are not attached to adapter 317 but are allowed to "float" inside adapter 317 to improve the transmission of vibration throughout the entire conical shell structure 301 assembly. Base 304, flange 305 and conical shell structure 301 may also be attached to each other by welding means, by means of bolts or by any other such means, and in some cases may also be attached to adapter 317 by such means. The height of conical shell structure 301 is 48 inches, as measured from its top 306 to its bottom on top of flange 305. The diameter of the opening of conical shell structure 301 is 36 inches at its top 306 and 12 inches at its bottom on top of flange 305. The slopping angle (cone opening angle) of shell structure 301 is 14°. The slopping angle is the angle created between a perpendicular line from the bottom of shell structure 301 to its top and a straight line from the bottom of shell structure 301 along its outer surface 303 to its top 306. Smaller slopping angles (e.g., 10°) and larger slopping angles (e.g., 20°-60°), as well as various other heights and diameters, may be used effectively, depending on the gas stream flow rate and other conditions such as the amount of surface area desired. The height and the diameter of shell structure 301 may vary depending on the cone opening angle: the smaller the angle, the taller the vent should be in order to provide the desired overall surface area as discussed below. Mounted on outer surface 303 are two pneumatic vibrators so designed and so located as to provide the desired level of vibration to the unit. Information about the specific mounting instructions, sizing and similar details of the vibrators is readily available from various vibrator manufacturers, taking into account the specific design of any particular sulfur particulates remover. The specific characteristics of the vibrators and their installation should take into account the need for the degree of vibration to be sufficient to dislodge sulfur particulates that tend to attach to inner surface 302 and aid their flow within the remover and into the sulfur storage tank. In addition, the vibration system design should provide the capability for adjusting the rate and force of vibration so as to allow an operator to fine tune the vibrators for the specific case. This is accomplished by utilizing air pressure regulators and variable frequency controls for pneumatic and electric vibrators, respectively. In the specific embodiment shown in FIG. 3, in order to provide structural stability to the system it is preferred to weld approximately 32-inch-long channels 307 on outer surface 303 and then attach pneumatic vibrators 308 to channels 307. Vibrator mounting plates 309 may be conveniently used to attach pneumatic vibrators 308 to channels 307. Electrical, hydraulic, pneumatic and other types of vibrators may be used, but pneumatic vibrators are preferred. Such vibrators are commercially available from several manufacturers such as Global Manufacturing, Inc., of Little Rock, Ark., and others. Information and data about these vibrators, their specifications, their performance and the manner of mounting them are readily available in several technical publications including *Ball Vibrators, Operating Instructions*, by Global Manufacturing, Inc. (Dec. 7, 2009), and at www.GlobalManufacturing.com, which is hereby incorporated by reference. Vibrators such as Global Manufacturing vibrator Model BS-10 (listed on said technical publications) have given satisfactory results. An air regulator may be used to control the vibrator speed. In most cases, at least two pneumatic vibrators 308 should be mounted on outer surface 303 at approximately symmetrical locations with respect to each other, as shown on FIG. 3. On small units, one vibrator may be adequate. On large units more than two vibrators may be recommended. Vent handles 310 are symmetrically installed on and around outer surface 303 for convenience in installing and maintaining the sulfur particulates remover. Internally-secured deflector plate 311 is mounted within inner surface 302 in order to provide a circuitous route for the gases that exit the system. Deflector plate 311 is a single plate in this preferred embodiment, but multiple plates may be used in other embodiments, as shown in FIG. 2. The deflector assists in redirecting the flow of the gas stream in order to optimize operating conditions and provide maximum operating efficiencies in minimizing the emissions of particulate sulfur and improving its recovery and reincorporation into the storage tank. Round adapter base 317 may be attached directly to sulfur storage tank roof 312 by welding means, by means of bolts or by any other such means. In the embodiment depicted in FIG. 3 particulates remover round adapter base 317 is attached to previously existing tank valve 313 by means of flange 314. Previously existing tank valve 313 in turn is attached by means of previously existing flange 316 to previously existing tank vent outlet 315 off sulfur storage tank roof 312. Particulates remover round adapter base 317 can also be directly attached (e.g., by welding or with the aid of a flange) to tank roof 312 if no previously existing tank valves or flanges are available or usable. Illustrations of the features of the cover plate and the venting means of the sulfur particulates remover are shown in FIG. 4.

Figure 4:
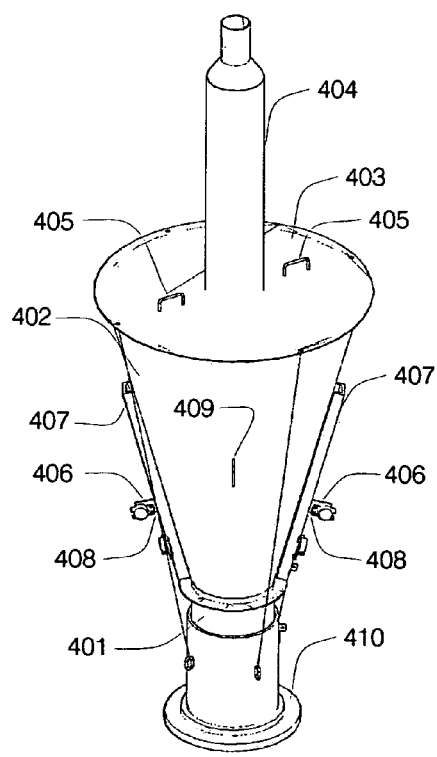
FIG. 4 is a schematic diagram depicting two alternative full-fledged unit embodiments of a conical-shell-structure sulfur particulates remover.
Figure 4:
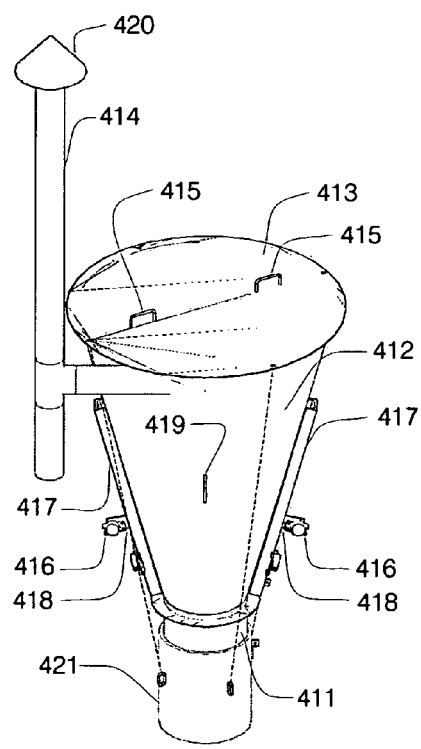

FIG. 4 depicts two slightly different alternative embodiments of the conical version of the sulfur particulates remover of the invention, including its cover plate and the venting means of the remover. Thus referring to FIG. 4, embodiment A is a full-fledged sulfur particulates remover comprising substantially round metal base 401, substantially conical shell structure 402, substantially round cover plate 403 and venting stack 404. Cover plate 403 is bolted to the top of conical shell structure 402 (it may also be welded, clamped or otherwise securely attached), and handles 405 are provided for convenience during cleaning and maintenance. Cover plate 403 has a 36-inch diameter and is preferably made of ⅛-inch-thick stainless steel. The venting means consist of vertical stack 404, also made of stainless steel or similar strong metal and welded or bolted to cover plate 403. Vertical stack 404 is 40 inches tall and has an outside diameter of approximately 8 inches at the bottom and approximately 4 inches at the top. The stack facilitates the venting of the processed gases to the atmosphere and provides height and direction to the flow of exiting gases. The dimensions of round metal base 401 and shell structure 402 are the same as those of round base 304 and conical shell structure 301 in FIG. 3. Pneumatic vibrators 406 are mounted on structural channels 407 using mounting plates 408 as already described. The sulfur particulates remover depicted in embodiment A is also provided with convenience handles 409 and flange 410 for attaching it to the existing valve on an existing outlet on the roof of the sulfur storage tank. Embodiment B in FIG. 4 is also a full-fledged sulfur particulates remover comprising substantially round metal base 411, substantially conical shell structure 412, substantially round cover plate 413 and venting stack 414. Cover plate 413 is bolted to the top of conical shell structure 412 (it may also be welded, clamped or otherwise securely attached), and handles 415 are provided for convenience during cleaning and maintenance. Cover plate 413 has a 36-inch diameter and is preferably made of ⅛-inch-thick stainless steel. In embodiment B, however, the venting means, consisting of stainless steel vertical stack 414, are not welded or bolted to cover plate 413, but rather jut out of conical shell structure 412 just below cover plate 413. Stack 414 is welded or otherwise attached to conical shell structure 412 and is provided with vent cap 420 to protect it from rain and other elements. An adjustable butterfly valve or similar damper (not shown) is optionally installed inside stack 414 in order to be able to control and adjust the amount of gases flowing out of the system. Vibrators 416 are attached to structural channels 417 on the outer surface of the unit with the help of mounting plates 418 as already described. Vertical stack 414 is 48 inches tall and has an outside diameter of approximately 4 inches at the bottom and approximately 4 inches at the top. The sulfur particulates remover depicted in embodiment B is also provided with convenience handles 419. No flange is provided because the unit is meant to be used on a storage tank that has an existing pipe-shaped outlet 421 into which round metal base 411 may fit snuggly. The tank may additionally be equipped with one or more regular vents of the type conventionally used in liquid sulfur storage tanks.

In operating the sulfur particulates remover, the gas stream from the vapor space above the surface of the molten sulfur may be allowed to exit the tank on its own, or its flow may be accelerated and controlled with the aid of a blower. The blower may be installed above the top opening of the conical shell structure or at some other convenient location to assist with the movement of the gas stream inside the sulfur particulates remover and control its flow rate. A separate conventional exhaust vent may also be restricted to reduce or otherwise control the gas flow. With the sulfur particulates removed from the vapors leaving the sulfur tank the particulate emissions are greatly reduced and the vapors can be easily processed through a simple fume scrubber without the complications and operations and maintenance issues associated with the particulates and sulfur flowers that will plug up and clog the air and liquid containing components of the scrubbing system.

It is significant that no external-source heating or cooling is necessary in the operation of the system of the present invention. It has been found that, as the gas stream moves up the sulfur particulates remover, the temperature of the emissions of particulate sulfur is caused to decrease, with the concomitant effect that the sulfur present in the sulfur mist remains in solid state or, if in gaseous or liquid state in the mist, sublimes, condenses and solidifies and drops back into the molten sulfur storage tank. Without the use of the vibrators feature of the invention these particles of solid and semi-solid sulfur tend to attach and stick to the inside surface of the conical shell structure and plug the remover, but when the specified vibrators are used it has been found that these sulfur particles not only are prevented from exiting and contaminating the environment but tend to fall back into the storage tank under their own weight. Hence, environmental contamination is avoided or minimized and sulfur losses are prevented or kept to a minimum; and/or the difficulty associated with scrubbing of the fumes is greatly reduced. External-source heating or cooling may be conveniently employed in some situations to further treat the gases exiting the sulfur particulates remover if deemed convenient in order to further remove sulfur and/or other contaminants from and otherwise clean the gas stream.

It has also been found that enough surface area should be provided inside the sulfur particulates remover to allow the sulfur vapor to cool sufficiently in order to cause the precipitation of the emissions of particulate sulfur, and that enough vibration should be provided to the surface of the conical shell structure to prevent the precipitated sulfur particles from attaching themselves to the conical shell structure surface and plugging the unit. If enough surface area is not provided inside the sulfur particulates remover, the flowing vapors do not cool down sufficiently and the sulfur does not sublime, condense and solidify in sufficient quantities; if too much surface area is provided inside the sulfur particulates remover, costs will increase without the benefit, and the efficiency of the operation may be adversely impacted due to the vapor temperature falling to a level that reduces fume throughput. The recommended surface area of the inner surface of the shell structure is a function of the gas flow rates, e.g., in cubic feet per minute, and of $\Delta T$ (in $^\circ$ F.), $\Delta T$ being the difference between the vapor space temperature and the atmospheric temperature outside the tank or container. Likewise, if enough vibration is not provided to the surface of the conical shell structure, then the solidifying sulfur will stick to the conical shell structure surface, adversely affecting the heat transfer and plugging or making the unit highly inefficient; whereas too much vibration applied to the surface of the conical shell structure adversely affects the mechanical integrity of the unit and its components. The required amount of such surface area inside the sulfur particulates remover unit is a function of the flow rate of the gases flowing up the unit, the composition of the gases and the difference between the temperature of the vapor space above the liquid sulfur inside the storage tank and the ambient temperature outside the tank. The required degree of vibration may also depend on the mechanical characteristics of the sulfur particulates remover, including the flexibility, stiffness, elasticity, size and thickness of its components. Also, the characteristics of the sulfur particulates and the manner in which they form inside the unit may affect the recommended setting of the vibrators. In most cases the sulfur particulates remover of the invention is able to remove between about 90% and 99% of the sulfur particulates, as measured by the weight of elemental sulfur, e.g., in pounds, per volume of gases exiting the system, e.g., in cubic feet. These substantial amounts of sulfur are not only removed from the exiting gases but are also returned to the storage tank and recovered, hence improving the environmental aspects of the storage facility and the overall efficiency of the storage operation.

Figure 5:
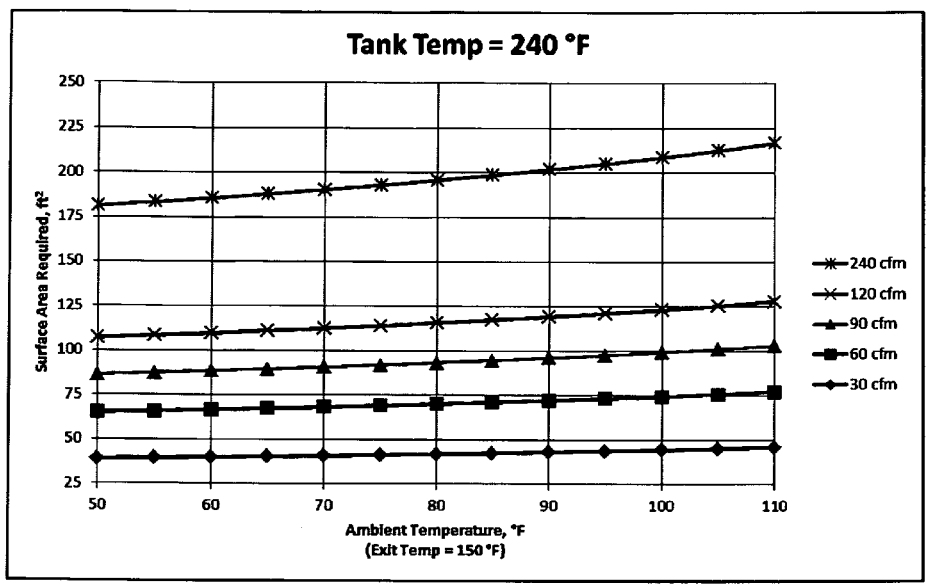
FIG. 5 is a chart showing the sulfur particulates remover recommended surface area as a function of ambient temperature for a sulfur tank having a vapor space temperature of 240° F.

As mentioned above, the recommended remover surface area for optimal cooling of the vapors and optimal removal of the sulfur particulates is determined by the sulfur tank vent gas rate requirements, tank vent gas temperature and ambient temperature. Once the tank ventilation rate and vent gas temperatures have been set by the tank design, the recommended remover surface area may be determined. For example, given a set tank temperature (i.e., the temperature of the vapor space in the tank) of 240° F., the optimal surface area for varying vent rates and ambient temperatures may be determined and are provided in the accompanying plots on FIG. 5. At tank temperatures above 240° F. the recommended surface area (area of inner surface of the shell structure) is larger than that indicated on FIG. 5; whereas for lower temperatures, the recommended surface area is less. The temperature difference between the tank vent gas and the ambient air determines the efficiency of heat removal by the unit. The larger this temperature difference, the more efficiently the unit will operate and the surface area required for particulate removal will be smaller. On the other hand, a small temperature difference will result in less efficient heat removal and may require a larger unit with more surface area in order to achieve the desired degree of cooling and particulates removal. The amount of time (residence time) the vapors spend inside of the unit is also a factor in ensuring good particulates removal. When considering varying ventilation rates, the residence time affects the recommended unit size and surface area. As can be seen on FIG. 5, the relationship between vent rate and recommended surface area is not linear, i.e., double the vent rate does not necessarily equate to double the recommended surface area. At 240° F., the tank vent gas consists of 0.0047 moles of sulfur vapor per mole of air. In this example the amount of entrained particulates in the vent gas from the sulfur tank was 650 ppm sulfur, that is, $5.23 \times 10^{-5}$ lbs/ft$^3$ (0.0000523 lbs/ft$^3$). The total amount of sulfur exiting the tank and entering the particulates remover was over 0.0034 lbs/ft$^3$. By using the sulfur particulates remover of the invention the temperature drops to 150° F. Under these conditions the liquid and solid sulfur particulates entrained in the vent gas solidify and drop back into the tank. The amount of sulfur measured exiting the particulates remover during testing was 70 ppm sulfur, that is, $5.66 \times 10^{-6}$ lbs/ft$^3$ (0.00000566 lbs/ft$^3$), or 0.17% of the amount of sulfur vapor and particulates in the sulfur tank vent gas. This reduction in the sulfur content of the vapor equates to 99.83% total sulfur removal (particulates and vapor).

Figure 6:
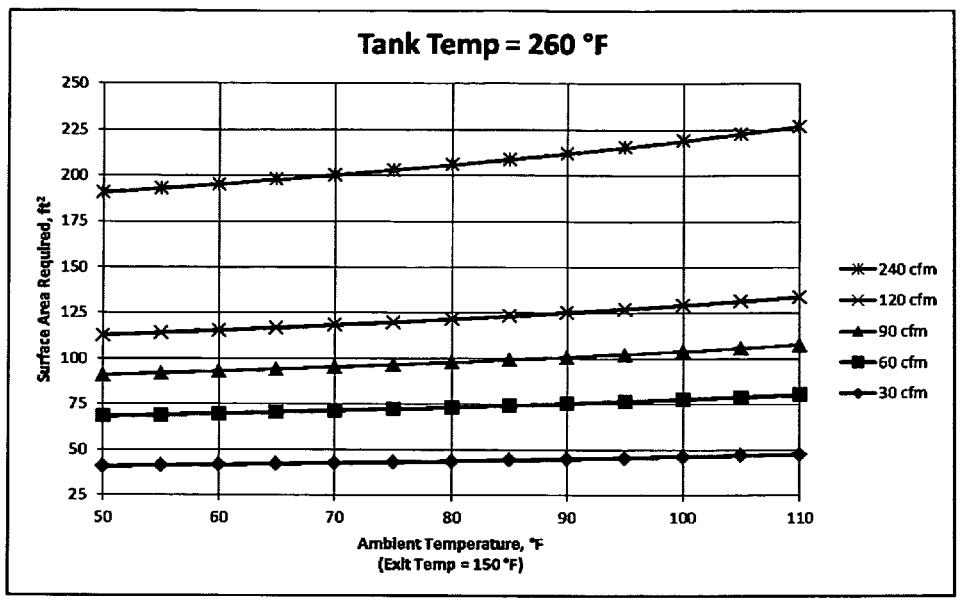
FIG. 6 is a chart showing the sulfur particulates remover recommended surface area as a function of ambient temperature for a sulfur tank having a vapor space temperature of 260° F. The various components and the elements of the components depicted in the drawings are not necessarily shown to scale of actual dimensions.

FIG. 6 shows one way of determining the optimal particulates remover surface area for a set tank temperature (i.e., the temperature of the vapor space in the tank) of 260° F. for varying vent rates and ambient temperatures. In this case the total amount of sulfur exiting the tank and entering the particulars remover is 0.0063 lbs/ft$^3$. Once the vent gas passes through the unit the sulfur concentration is reduced to 70 ppm sulfur, i.e., $5.66 \times 10^{-6}$ lbs/ft$^3$ (0.00000566 lbs/ft$^3$). This removal rates equates to 99.91% overall sulfur recovery (vapor and particulates), i.e., 99.91% of the sulfur solidifies and goes back into the tank.

It has been determined that, in most cases, the surface area of the inner surface of the shell structure of the particles remover should be between about 20 and 250 square feet. When sufficient surface area is provided, other configurations of the shell structure, for example a substantially round (cylindrical) configuration, may be possible for the sulfur particulates remover system if the other elements of the invention, i.e., the vibrators, the deflector plates, the cover, etc., are also incorporated into the system.

The sulfur particulates remover recommended surface area for the shell structure may also be estimated by means of the following formula:

$$A = \frac{Q_{in} - Q_{out}}{U(T_{tank} - T_{amb})}$$

where:
A=surface area of the inner surface of remover shell structure [ft$^2$]
$Q_{in}$=heat content of the vapor entering the unit [BTU/hr]
$Q_{out}$=heat content of the vapor exiting the unit [BTU/hr]
U=overall heat transfer coefficient (given below) [BTU/hr ft$^2$ ° F.]
$T_{tank}$=temperature in the vapor space of the tank [° F.]
$T_{amb}$=ambient temperature [° F.],
and the heat content of the vapor is calculated as follows:

$$Q = 60 V \rho c_p T$$

where:
Q=heat content of the vapor [BTU/hr]
V=volumetric flow of the vapor [cfm]
$\rho$=density of the vapor (assumed to be that of air) [lb/ft$^3$]
$c_p$=heat capacity of the vapor [BTU/lb° F.]
T=temperature of the vapor [° F.]
The overall heat transfer coefficient will vary with the volumetric flow of the vapor (V) as shown below:

| Volumetric flow of the vapor (V) [cfm] | Overall Heat Transfer Coefficient (U) [BTU/hr ft$^2$ °F.] |
| --- | --- |
| 30 | 0.3553 |
| 60 | 0.4242 |
| 90 | 0.4776 |
| 120 | 0.5136 |
| 240 | 0.6073 |

While the present invention has been described herein in terms of particular embodiments and applications, in both summarized and detailed forms, it is not intended that any of these descriptions in any way should limit its scope to any such embodiments and applications; and it will be understood that substitutions, changes and variations in the described embodiments, applications and details of the method and the formulations disclosed herein can be made by those skilled in the art without departing from the spirit of this invention.

Where the article "a" (or "an") is used in the following claims, it is intended to mean "at least one" unless clearly indicated otherwise.

We claim:

1. A system for removing sulfur vapor and sulfur particulates from a gaseous stream generated in a liquid sulfur tank or container without centrifugal separation, said gaseous stream containing elemental sulfur in vapor form, liquid droplet form, solid particulate form or any two or three such forms, said liquid sulfur tank or container having a roof and an opening through which said gaseous stream may exit said sulfur tank or container, said system comprising the following components in combination:
a) a substantially conical or prismatic shell structure having an inner surface and an outer surface, said shell structure being attachable to said opening through which said gaseous stream may exit said sulfur tank or container, said shell structure having a relatively narrow inlet port at its lower end through which said gaseous stream may enter said shell structure and a relatively wide outlet port at its upper end through which said gaseous stream may exit said shell structure, whereby the velocity of said gaseous stream entering said shell structure is reduced as said gaseous stream flows upwards through said shell structure and the temperature of said gaseous stream entering said shell structure is also reduced as said gaseous stream flows upwards through said shell structure thereby causing said elemental sulfur contained in said gaseous stream to change phases;
b) means for inducing vibration into said substantially conical or prismatic shell structure, whereby said sulfur that has changed phases precipitates as sulfur particles without attaching to said shell structure and is thereafter recovered, said means attached to said outer surface of said shell structure;
c) an internally-secured deflector plate mounted within said inner surface of said substantially conical or prismatic shell structure and capable of providing a circuitous route for said exiting gaseous stream flowing through said system;
d) a cover attached to the top of said shell structure; and
e) venting means, attached to said cover, for venting to the atmosphere said gaseous stream from said shell structure.

2. The system of claim 1, wherein said substantially conical or prismatic shell structure is made of steel having a thickness of between about $1/32$ inch and $1/4$ inch.

3. The system of claim 1, wherein said substantially conical or prismatic shell structure is a substantially round cone made of steel having a thickness of between about $1/32$ inch and $1/4$ inch.

4. The system of claim 1, wherein said means for inducing vibration into said substantially conical or prismatic shell structure comprise at least two vibrators attached to said outer surface of said shell structure at approximately symmetrical positions with respect to each other on said outer surface.

5. The system of claim 1, wherein the slopping angle of said substantially conical or prismatic shell structure is between about 10° and 60°.

6. The system of claim 1, wherein the surface area of said inner surface of said substantially conical or prismatic shell structure is between about 20 and 250 square feet.

7. The system of claim 1, further comprising a substantially round or rectangular base having an inner surface and an outer surface, and attached to the bottom of said substantially conical or prismatic shell structure, said substantially round or rectangular base providing additional inner surface area to said system for removing sulfur particulates and a conduit for the sulfur particulates to return to said liquid sulfur tank or container.

8. A system for removing sulfur vapor and sulfur particulates from a gaseous stream generated in a liquid sulfur tank or container without centrifugal separation, said gaseous stream containing elemental sulfur in vapor form, liquid droplet form, solid particulate form or any two or three such forms, said liquid sulfur tank or container having a roof and an opening through which said gaseous stream may exit said sulfur tank or container, said system comprising the following components in combination:
a) a substantially conical shell structure having an inner surface of between about 20 and 250 square feet, an outer surface, and a slopping angle of between about 10° and 60°, said substantially conical shell structure made of steel having a thickness of between about $1/32$ inch and $1/4$ inch; said shell structure being attachable to said opening through which said gaseous stream may exit said sulfur tank or container, said shell structure having a relatively narrow inlet port at its lower end through which said gaseous stream may enter said shell structure and a relatively wider outlet port at its upper end through which said gaseous stream may exit said shell structure, whereby the velocity of said gaseous stream entering said shell structure is reduced as said gaseous stream flows upwards through said shell structure and the temperature of said gaseous stream entering said shell structure is also reduced as said gaseous stream flows upwards through said shell structure thereby causing said elemental sulfur contained in said gaseous stream to change phases;
b) means for inducing vibration into said substantially conical shell structure, whereby said sulfur that has changed phases precipitates as sulfur particles without attaching to said shell structure and is thereafter recovered, said means for inducing vibration comprising at least two vibrators attached to said outer surface of said shell structure at approximately symmetrical positions with respect to each other on said outer surface of said shell structure;
c) an internally-secured deflector plate mounted within said inner surface of said substantially conical shell structure and capable of providing a circuitous route for said gaseous stream exiting said sulfur tank or container through said system;
d) a substantially round base having an inner surface and an outer surface, and attached to the bottom of said substantially conical shell structure, and providing additional inner surface area to said system for removing sulfur particulates, said substantially round base being attachable to said opening through which said gaseous stream may exit said sulfur tank or container;
e) a cover attached to the top of said substantially conical shell structure; and
f) venting means, attached to said cover, for venting to the atmosphere said gaseous stream from said shell structure.

* * * * *